United States Patent [19]

Hogan

[11] Patent Number: 5,201,798
[45] Date of Patent: Apr. 13, 1993

[54] MULTIFUNCTION INTEGRATED POWER UNIT AND POWER TRANSFER APPARATUS THEREFOR

[75] Inventor: Clarence C. Hogan, Mesa, Ariz.

[73] Assignee: Allied-Signal Inc., Morris Township, Morris County, N.J.

[21] Appl. No.: 587,709

[22] Filed: Sep. 24, 1990

[51] Int. Cl.⁵ .............................................. F02C 1/06
[52] U.S. Cl. ................... 60/39.161; 60/39.21; 74/665 E; 74/DIG. 5
[58] Field of Search ............... 60/39.21, 39.161, 727; 74/DIG. 5, 665 E, 665 B, 661

[56] References Cited

U.S. PATENT DOCUMENTS

| | | | |
|---|---|---|---|
| 1,479,993 | 1/1924 | Kirkham | 244/59 X |
| 1,886,327 | 11/1937 | Carlson | 244/58 |
| 2,119,156 | 5/1938 | Finnegan et al. | 244/59 X |
| 2,611,239 | 9/1952 | Briggs | 60/39.14 |
| 2,643,511 | 6/1953 | Briggs | 60/39.14 |
| 2,777,301 | 1/1957 | Kuhn | 62/136 |
| 3,416,309 | 12/1968 | Elmes et al. | 60/39.15 |
| 3,514,945 | 6/1970 | Austin | 60/39.161 |
| 3,662,975 | 5/1972 | Driskill | 244/58 |
| 3,965,673 | 6/1976 | Freidrich | 60/39.14 |
| 3,967,132 | 6/1976 | Takamine | 290/412 |
| 4,046,335 | 9/1977 | Osberger | 244/17.19 |
| 4,077,202 | 3/1978 | Schutze | 60/39.14 |
| 4,257,281 | 3/1981 | Bunger | 74/6 |
| 4,514,976 | 5/1985 | Christoff | 60/39.07 |
| 4,625,583 | 12/1986 | Kronogard | 74/665 E |
| 4,829,850 | 5/1989 | Soloy | 74/665 E |
| 4,864,812 | 9/1989 | Rodgers et al. | 60/727 |

FOREIGN PATENT DOCUMENTS

| | | |
|---|---|---|
| 0200178 | 4/1986 | European Pat. Off. . |
| 0344454 | 4/1989 | European Pat. Off. . |
| 0343412 | 5/1989 | European Pat. Off. . |
| 868516 | 12/1940 | France . |
| 1280193 | 1/1961 | France . |
| 703262 | 2/1954 | United Kingdom . |
| 2076897 | 6/1980 | United Kingdom . |

OTHER PUBLICATIONS

International Search Report.
Aircraft Engineering, "VFW-Fokker Electrical System", Jun. 1974, 2 pages.

Primary Examiner—Richard A. Bertsch
Assistant Examiner—Charles G. Freay
Attorney, Agent, or Firm—Terry Miller; Jerry J. Holden; Robert A. Walsh

[57] ABSTRACT

A multifunction integrated power unit (MIPU) (10) for use aboard aircraft provides the functions both of an auxiliary power unit and of an emergency power unit while being smaller, lighter, and less expensive than the two units it replaces. Additionally, the integration of both functions in a single unit allows elimination of duplicated service devices and a further reduction in size, cost, and weight in the aircraft itself. The MIPU (10) includes two turbine engines (12, 22) operable under differing conditions, an integrating gear box (34) receiving power from the two engines (12, 22) selectively, and a plurality of accessory devices (36, 38) receiving shaft power from either of the two engines (12, 22) via the gear box (34). The gear box (34) includes a power transfer unit (PTU) apparatus (108) which selectively delivers shaft power from one of the engines (12, 22) to the accessory devices (36, 38).

17 Claims, 5 Drawing Sheets

MULTIFUNCTION INTEGRATED POWER UNIT AND POWER TRANSFER APPARATUS THEREFOR

TECHNICAL FIELD

The present invention is in the technical field of auxiliary power units (APU) and emergency power units (EPU) for aircraft. More particularly, the present invention relates to an integrated power unit which combines the functions of an auxiliary power unit and of an emergency power unit into a single unit. The integrated power unit may perform either function, and transition between functions, while affording a smaller and lighter apparatus than the total of the two units which it replaces. Additionally, the present invention affords several simplifications in aircraft apparatus in comparison with that required when two separate units are employed to provide the functions of supplying auxiliary power and emergency power to the aircraft.

Still more particularly, the present invention relates to an improved clutch device in an integrated power unit of the type described, which clutch device selectively delivers shaft power from one of the APU or EPU to the power consuming accessory devices.

BACKGROUND OF THE INVENTION

Conventional turbine engine auxiliary power units are well known in the aerospace technologies. These units are used to provide power to the aircraft either on the ground or in flight, or both. This power may be provided in the form of one or more of electrical power, hydraulic power, pressurized air, or another form, according to the requirements of the aircraft in which the APU is installed. Unfortunately, starting of an APU may require from many seconds to as much as a few minutes. During this starting time power from the APU is, of course, not available to the aircraft. As a result, some essential aircraft systems may not be operated during starting of the APU. Also, if the aircraft is above a determined altitude, it is not possible to start the APU because of low ambient pressure. An aircraft with only an APU may require some other system, such as an EPU or a ram air turbine, to provide power to the aircraft until the APU can be started.

Similarly, EPU's are known which employ a hydrazine decomposition chamber, for example, or a jet fuel combustor to provide a flow of high temperature pressurized motive gas to a turbine. The turbine is employed to drive a hydraulic pump or electric generator, for example. The EPU is employed to provide hydraulic or electric power (or both) on a relatively short term basis after a failure of an essential system associated with the aircraft main engines. This emergency power supply allows continuation of controlled aircraft flight for a limited time while the aircraft is brought to a landing or to an altitude low enough to allow starting of the aircraft APU.

The development of unstable aircraft has in particular increased the necessity for providing a rapidly available source of emergency power. Upon a failure of the main hydraulic pump, or main generator, or of the aircraft propulsion engine driving these devices, the aircraft cannot be maintained in controlled flight. Without hydraulic power to move aircraft control surfaces, or electrical power for flight control computers, the unstable aircraft is uncontrollable. Thus, these aircraft must have a source of emergency power which is available almost immediately after the failure of a flight control related power system. Unfortunately, the conventional technology for this purpose employs hydrazine fuel and a decomposition chamber containing a catalytic reaction bed. When such an EPU is operated, even for a short time, the toxic hydrazine must be flushed from the aircraft system using neutralizing chemicals, and the decomposition chamber must be replaced.

As a result, a transient in the aircraft systems, for example, which does not represent a genuine emergency, but which exercises the EPU can be very expensive. Also, this type of unnecessary exercise of the EPU may compromise the availability of the EPU for operation were a genuine emergency to occur. As a result, EPU's which employ hydrazine and a decomposition chamber are widely recognized as an unsatisfactory solution to the need for an emergency power supply aboard aircraft.

Additional shortcomings of conventional technology which provides both an APU and a separate EPU are that the weight, size, fuel consumption, complexity, cost and maintenance requirements of the aircraft are all increased while the performance of the aircraft is decreased.

In view of the recognized deficiencies of conventional technology in the aircraft APU and EPU fields, it is an object for this invention to provide a multifunction integrated power unit (MIPU) which performs the functions of an APU and an EPU, while being smaller and lighter in weight than the total of the two conventional units which it replaces.

An additional object is to provide a MIPU of the above-described character which does not require hydrazine or other similar toxic or unstable chemical for its operation.

Still another object for the present invention is to provide a MIPU having both APU and EPU functions while using only a single fuel.

Yet another object for the present invention is to provide a MIPU combining functions of an EPU and an APU and which can transition from one function to the other with no interruption in power supply to the aircraft.

Still another objective for the present invention is to provide a selective clutch device which delivers power from one of the APU or EPU to the power consuming accessory devices, and which may be conveniently removed from the MIPU and serviced or replaced without extensive disassembly of the MIPU.

Accordingly, the present invention provides a power transfer unit comprising an elongate tubular member, said tubular member externally defining first cooperating means for journaling said tubular member upon a housing, said tubular member externally defining second cooperating means for rotatable shaft power distribution delivering torque from said tubular member to a shaft power consuming device, and a pair of oppositely disposed one-way overrunning clutches carried within said tubular member, each of said pair of clutches being disposed to transmit torque to said tubular member in one rotational direction and to allow said tubular member to overrun relative thereto in said one direction, when said tubular member is rotationally driven at a higher speed by the other of said pair of clutches, each one of said pair of clutches including means for receiving shaft power transmitted thereto.

An advantage of the present invention is that the MIPU may operate on the same jet fuel used in the propulsion engine of the aircraft to provide both EPU and APU functions.

Additional advantages provided by the MIPU of the present invention is the reduction in size, weight, cost, complexity, and maintenance requirements made possible in the aircraft itself resulting from the use of the MIPU rather than separate EPU and APU units.

Still further, the MIPU may be serviced to repair or replace the selective clutch which selects shaft power from one or the other of the APU or EPU portion of the MIPU without extensive disassembly thereof.

Additional objects and advantages of the present invention will appear from a reading of the following detailed description of a single preferred embodiment of the invention taken in conjunction with the appended drawing figures, in which:

DESCRIPTION OF THE PREFERRED EMBODIMENT

Figure 1:
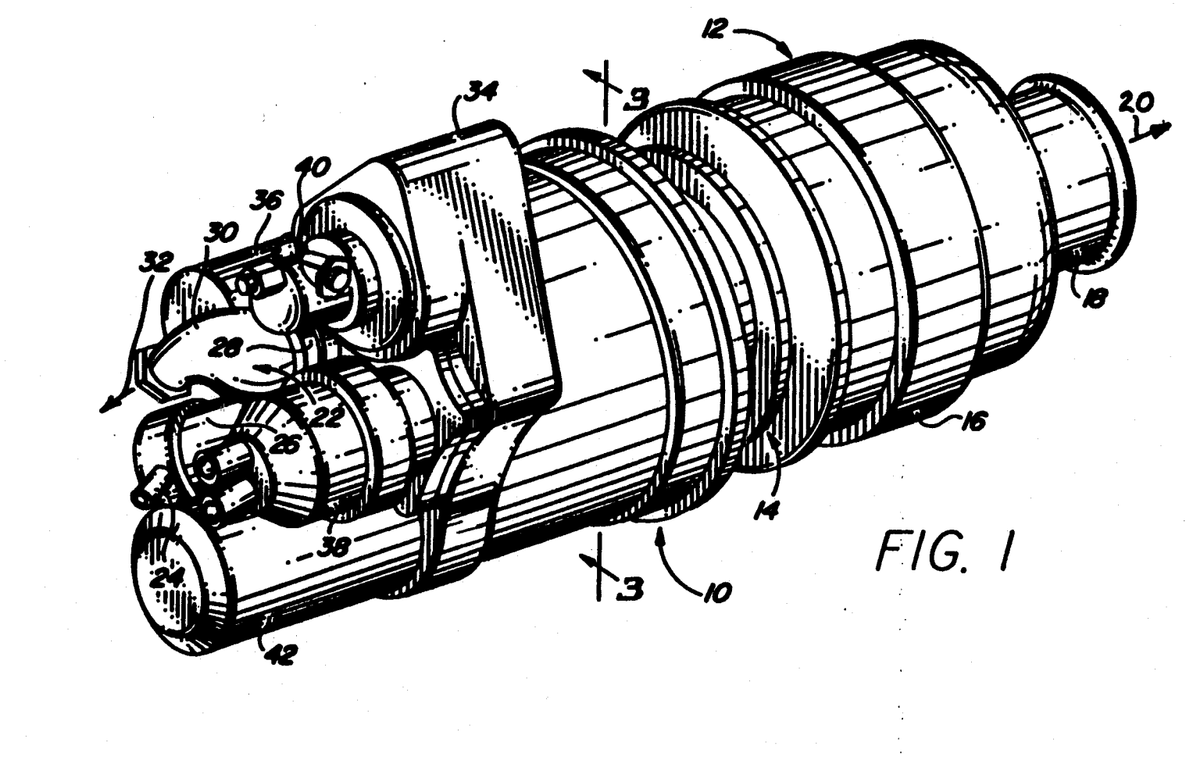
FIG. 1 presents a perspective view of a multi-function integrated power unit (MIPU) embodying the present invention.

FIG. 1 depicts a multifunction integrated power unit (MIPU) 10. The MIPU 10 includes a combustion turbine engine portion generally referenced with the numeral 12 having an annular air intake opening 14, a combustor section 16, and an exhaust duct section 18. When operating, the engine portion 12 inducts ambient air via inlet 14, employs this air pressurized along with a supply of jet engine fuel to support combustion within combustor section 16, and discharges the combustion products from duct section 18, as depicted by arrow 20. Thus, it will be understood that the engine section 12 provides shaft power via a respective output shaft (not visible viewing FIG. 1).

The MIPU 10 also includes a second combustion turbine engine portion 22. The engine portion 22 includes an air inlet section 24, a combustor section 26, and a turbine housing section 28, and an exhaust outlet section 30. During operation, the second combustion turbine portion 22 receives pressurized air from a source thereof (not shown in FIG. 1) and employs this air along with a supply of jet engine fuel to support combustion in combustor section 26. The combustion products from combustor section 26 flow through turbine housing section 28 and are discharged from exhaust outlet 30, as depicted by arrow 32. Accordingly, it is to be understood that the second combustion turbine engine portion 22 also provides shaft power at a respective output shaft thereof (also not visible viewing FIG. 1).

Additionally, the MIPU 10 includes an integrating gear box portion 34 disposed between the first engine portion 12 and the second engine portion 22. Additional description of the gear box portion 34 is provided below. However, in overview, the gear box portion 34 operatively associates with both of the power output shafts of the engine portions 12 and 22 in order to receive shaft power from either engine portion.

Finally, the MIPU 10 includes a plurality of shaft power consuming accessory devices mounted to the gear box 34 and rotatively driven thereby. These power consuming devices include an electrical generator 36, a first hydraulic pump 38, and a second fluid pump 40. As will be more fully explained hereinbelow, the gear box 34 also carries an air-expansion type of starter motor 42 which is effective for power input to the gear box 34 for starting of the first engine 12.

Figure 2:
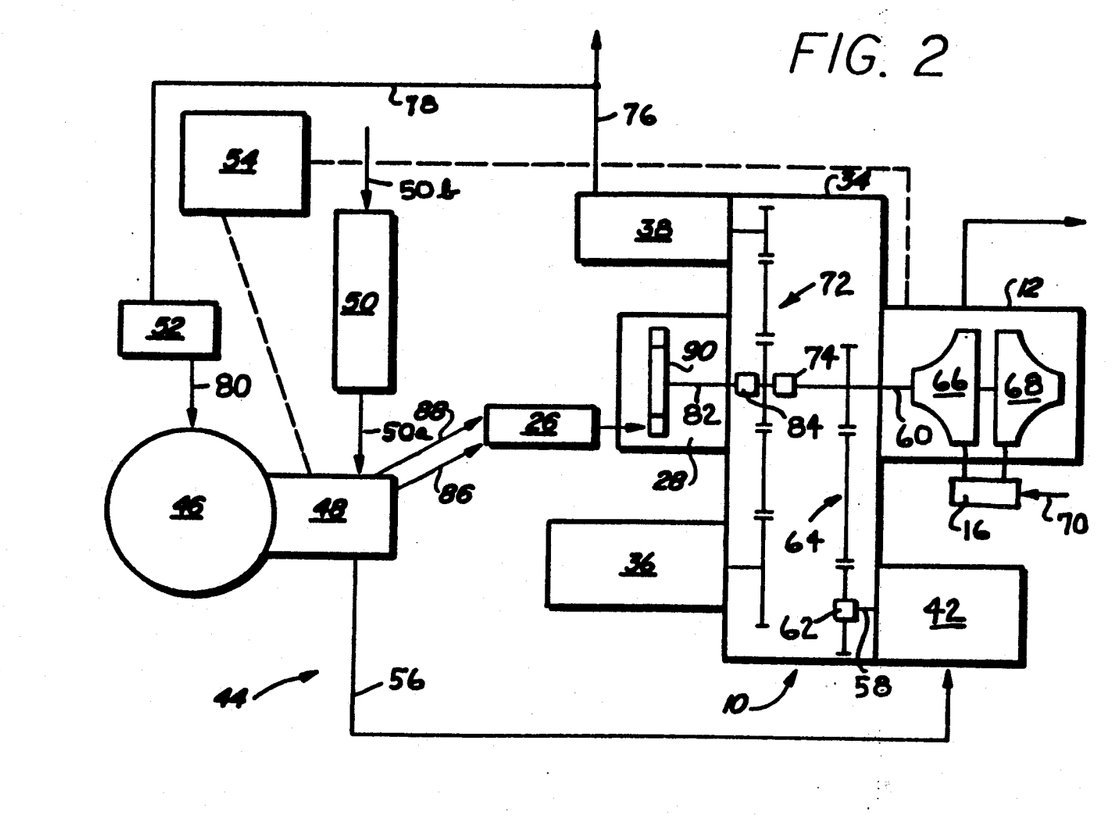
FIG. 2 schematically depicts a MIPU system according to the present invention.

Having received an overview of the MIPU 10, attention may now be directed to a MIPU system 44 depicted schematically in FIG. 2. It is seen that the MIPU system 44 includes a MIPU 10 along with a pressurized air storage chamber 46, a flow control module 48, a pressurized fuel storage chamber 50 communicating with module 48, a hydraulically operated air compressor unit 52, and a system control unit (SCU) 54. It will be recalled that the MIPU 10 is operable to perform the function of an APU, or of an EPU, and to transition from operation as an EPU to operation as an APU. Therefore, the operational modes for the MIPU system 44 are starting and operation as an APU, starting and operation as an EPU, and transition from operation as an EPU to operation as an APU.

Starting of the MIPU 10 as an APU is accomplished under control of the system control unit (SCU) 54. This SCU 54 commands the flow control unit 48 to direct a controlled flow of pressurized air from storage chamber 46 to starter motor 42 via a conduit 56. The starter motor 42 is coupled at an output shaft 58 thereof to a shaft 60 of the first engine 12 via a one way sprag clutch 62 and a gear train 64. The shaft 60 is the output shaft of engine 12 and also drivingly carries a centrifugal compressor rotor 66 and a radial inflow turbine rotor 68. Thus, the first engine 12 is accelerated toward its ignition and self-sustaining speed. As ignition speed for the first engine 12 is approached, the SCU commands provision of a scheduled flow of jet engine fuel to the combustor section 16 of the engine 12 via a conduit 70. This fuel flow along with pressurized air provided by compressor rotor 66 supports combustion to provide a flow of pressurized high temperature combustion products to the turbine rotor 68. The turbine rotor 68 drives the compressor rotor 66 and provides shaft power via shaft 60.

After attaining self-sustaining speed, the first engine 12 accelerates under its own power to its operating speed, and the flow of pressurized air to starter motor 42 is discontinued by the SCU 54. Clutch 62 insures that starter 42 is not driven by engine (12). The engine (12) provides shaft power to a gear train 72 within the gear box 34 via the shaft 60 and an interposed sprag clutch 74. The accessory devices 36, 38 and 40 are drivingly connected to the gear train 72 to receive shaft power therefrom (device 40 not being shown on FIG. 2 in the interest of simplicity of the schematic). Thus, the generator 34 provides electrical power to the aircraft while the hydraulic pump 38 provides hydraulic power via a conduit 72. The fluid pump 40 draws lubricating oil from the interior of gear box 34 and circulates this oil pressurized to various bearings (also not shown on FIG. 2) of the MIPU 10.

It will be recalled that the MIPU system 44 includes a hydraulically driven air compressor unit 52. After the first engine 12 is started, the air compressor unit 52 is operated under the control of the SCU to recharge the pressurized air storage chamber 46. The compressor unit 52 receives hydraulic power from conduit 76 via a branch conduit 78 and draws in ambient air. This ambient air is delivered pressurized to the chamber 46 via a conduit 80.

It will be seen viewing FIG. 2 that the MIPU 10 also includes a power output shaft 82 associated with the second engine 22. The shaft 82 is connected with gear train 72 via a sprag clutch 84. This clutch 84 insures that engine 12 does not drive the engine 22.

Similarly, starting of the MIPU 10 as an EPU is also accomplished under control of the SCU 54. The SCU 54 commands air flow control unit 48 to direct a controlled flow of pressurized air from the storage chamber 46 to the combustor section 26 of the second engine 22 via a conduit 86 and the air inlet 24 thereof. In a sequenced relationship with this flow of pressurized air to combustor 26, the SCU 54 commands the fuel flow control unit 48 to provide also a scheduled flow of jet engine fuel to the combustor section 26 of engine 22 via a conduit 88. Pressurized jet engine fuel is supplied to the flow control unit 48 by the pressurized fuel storage chamber 50 via a conduit 50a. The fuel storage chamber 50 captively receives jet fuel from the aircraft at a comparatively low pressure via a conduit 50b, after which the chamber is pressurized in preparation for operation of the MIPU system 44 in the EPU mode. This flow of pressurized air and jet fuel to combustor 26 supports combustion producing a flow of pressurized high temperature combustion products. Combustion products flow from combustor 26 across a turbine wheel 90 rotatably carried within the turbine housing section 28 of the engine 22. The turbine wheel 90 is drivingly carried by shaft 82 and delivers shaft power thereto.

Tests of a MIPU embodying the present invention have shown that power is delivered by engine 22 to the gear train 72 and accessories 36–40 in about two seconds after a start command. In this EPU mode of operation, the clutch 74 insures that the engine 22 does not drive engine 12. Also during operation of the MIPU 10 in EPU mode, the air compressor 52 may be used to recharge air storage chamber 46. However, because the engine 22 is power limited in its driving of the accessories 36–40 and because operation of engine 22 would ordinarily occur at high aircraft altitudes so that recharging of the chamber by pressurizing ambient air would be inefficient, such recharging of chamber 46 is not desirable in EPU mode of operation. Instead, sufficient storage volume is desirably provided in chambers 46 and 50 for all of operation of the MIPU 10 in EPU mode for the period required for aircraft descent to a level allowing starting of engine 12, for the transition from EPU to APU mode, and for a safety margin.

Transition of the MIPU 10 from operation in EPU mode to operation in APU mode is also accomplished under control of SCU 54. With the MIPU 10 operating in EPU mode so that engine 22 is driving the accessories 36–40, a start of engine 12 is commanded. That is, clutch 84 is engaged while clutch 74 is overrunning. As discussed above in connection with the starting of MIPU 10 in APU mode, the air storage chamber 46 supplies pressurized air to starter motor 42. However, in this case the storage chamber 46 is simultaneously supplying pressurized air to combustor section 26 to maintain operation in EPU mode. Starting of the engine 12 proceeds as described above with the exception that when ignition speed of the engine 12 is reached, fuel flow to combustion section 16 is initiated while maintaining flow of pressurized air and fuel to combustion section 26. Upon the engine 12 attaining about ninety-five percent of its rated speed, the SCU 54 commands that the engine 22 be shut down. That is, the flow of pressurized air and fuel to combustor section 26 is shut off. Thereafter, the speed of shaft 82 decreases while that of shaft 60 is increasing. Consequently, the clutches 74 and 84 reverse their roles so that the former is engaged while the latter overruns. The engine 22 coasts to a stop while the engine 12 drives the accessories 36–40. Once this transition to APU mode is completed, the air compressor 52 is employed to recharge storage chamber 46. Also, pressure is vented from pressurized fuel storage chamber 50 so that the latter may be recharged with jet engine fuel at a comparatively low pressure from the aircraft via conduit 50b. Once recharged with fuel the fuel storage chamber 50 is again pressurized by use of pressurized air from chamber 46 in preparation for the next operation of the MIPU 44 in EPU mode.

Figure 3A:
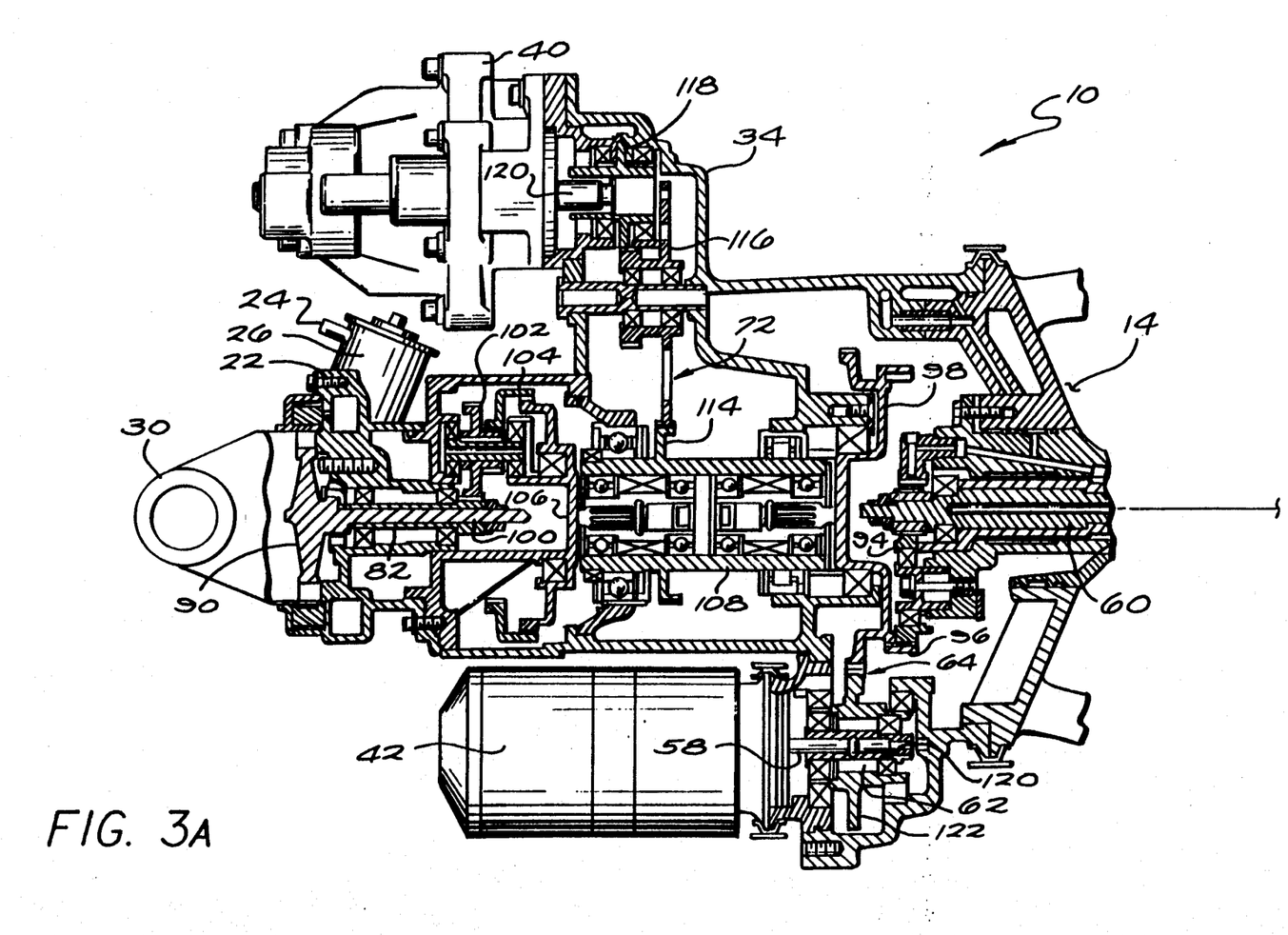
FIGS. 3A, and 3B, in conjunction provide a longitudinal partially cross sectional view of the MIPU depicted in FIG. 1, and generally taken along the plane established by lines 3—3 thereof.
Figure 3B:
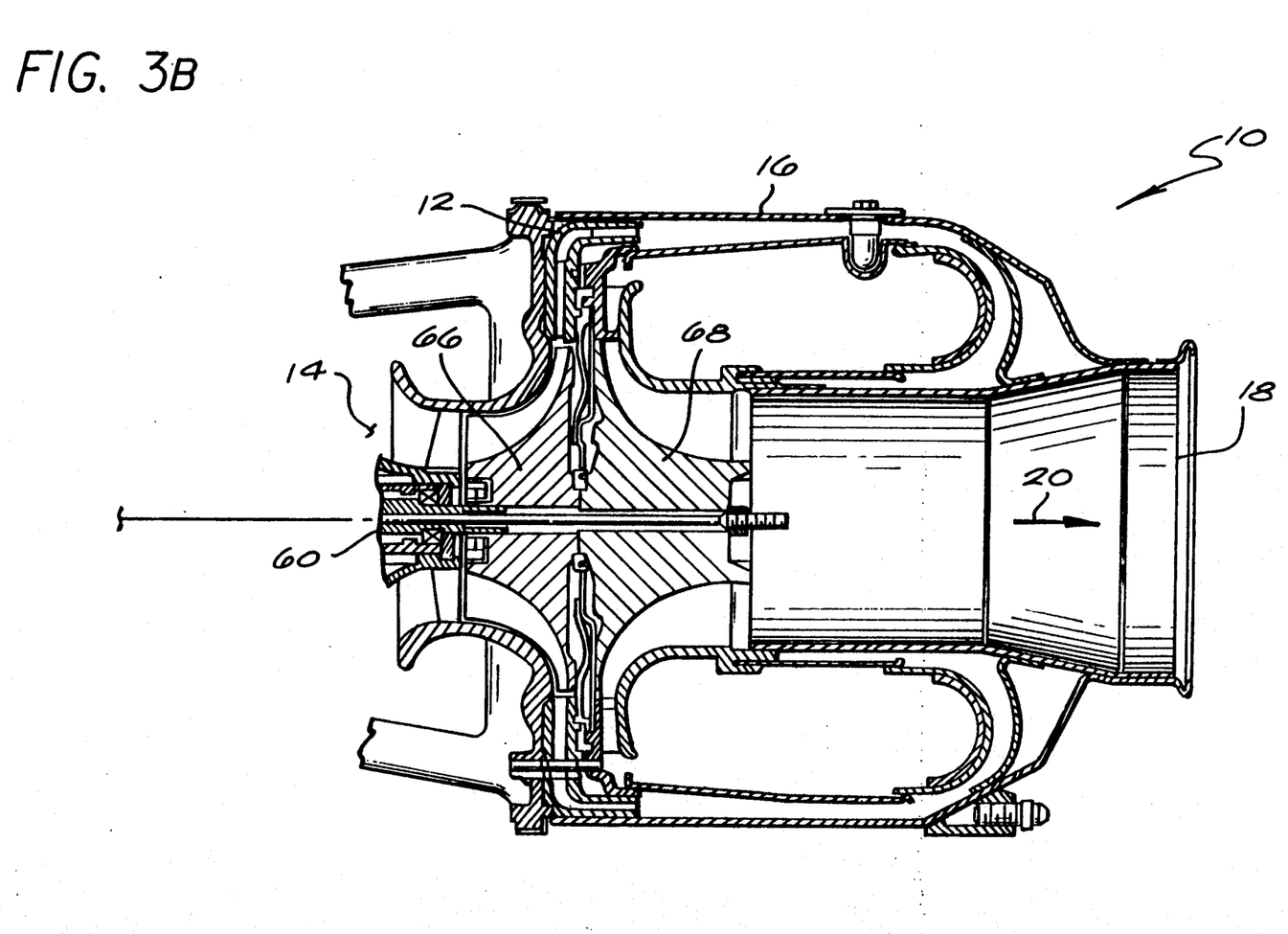

Attention now more particularly to FIGS. 3A and 3B, in conjunction will show that the MIPU 10 is arranged with the output shaft 60 of engine 12 and the output shaft 82 of engine 22 coaxially aligned with one another. The gear box 34 is received between the engines 12 and 22, while gear train 72 includes a pinion gear 92 drivingly carried by shaft 60, an idler gear 94 meshing with the pinion 92, and a ring gear 96 meshing with the idler gear 94. Ring gear 96 is carried by a first carrier member 98 journaled by the gear box 34 coaxially with the shafts 60 and 82.

Similarly, the gear train 72 also includes a pinion gear 100 drivingly carried by shaft 82, a compound idler gear 102 meshing with the pinion 100, and a ring gear 104 meshing with the idler gear 102. The ring gear 104 is carried by a second tubular carrier member 106 journaled in gear box 34 coaxially with the shafts 60 and 82, and with the first carrier member 98. Relatively rotatively carried by the gear box 34 coaxial with first carrier member 98 and second carrier member 106 is a tubular power transfer apparatus (PTU) 108. The first carrier member 98 includes a respective stub shaft 110 which is externally splined and received by the power transfer apparatus 108 to deliver power thereto, as is further described below. The second carrier member 106 similarly includes a respective second stub shaft 112 which is also externally splined and received by the power transfer apparatus 108 to deliver power thereto.

Power transfer apparatus 108 carries both the first and second sprag clutches 74 and 84, respectively, and includes an externally disposed gear portion 114 which in mesh with other gear (to be described) complete the gear train 72. It is understood that each of the engines 12 and 22 when driving the accessories 36–40 applies torque rotating power transfer apparatus 108 in the same direction. Consequently, the result of the above construction is that the power transfer apparatus 108 may not rotate slower than either one of the carrier members 98 and 106, but may overrun the slower of these two members if driven to a higher speed by the other carrier member.

Meshing with the power transfer apparatus 108 is a compound idler gear 116. The idler gear 116 meshes with a driven gear shaft member 118, which drivingly couples with a power input shaft 120 of hydraulic pump 40. Also seen in FIG. 3 is the mesh of a drive gear 122 with a second ring gear 124 carried by carrier member 98. The drive gear 122 is journaled by the gear box 34, and in turn journals a clutch shaft 126. The drive gear 122 and clutch shaft 126 cooperatively carry sprag clutch 62, while the shaft 126 drivingly engages the shaft 58 of starter motor 42. It will be noted viewing FIGS. 3A, and 3B, that the pump 40 and starter 42 are generally disposed diametrically on opposite sides of the second engine 22. Elements 122, 124, and 126 define gear train 64.

Those ordinarily skilled in the pertinent arts will easily understand that the gear box 34 similarly includes gear members (not shown) which are part of gear train 72, and which extended from mesh with gear portion 114 to the generator 36 and pump 38. Thus, it is understood that the power transfer apparatus 108 is central to power distribution in the gear box 34, and that branches of the gear train 72 lead from the apparatus 108 to each of the power consuming accessories 36-40.

Figure 4:
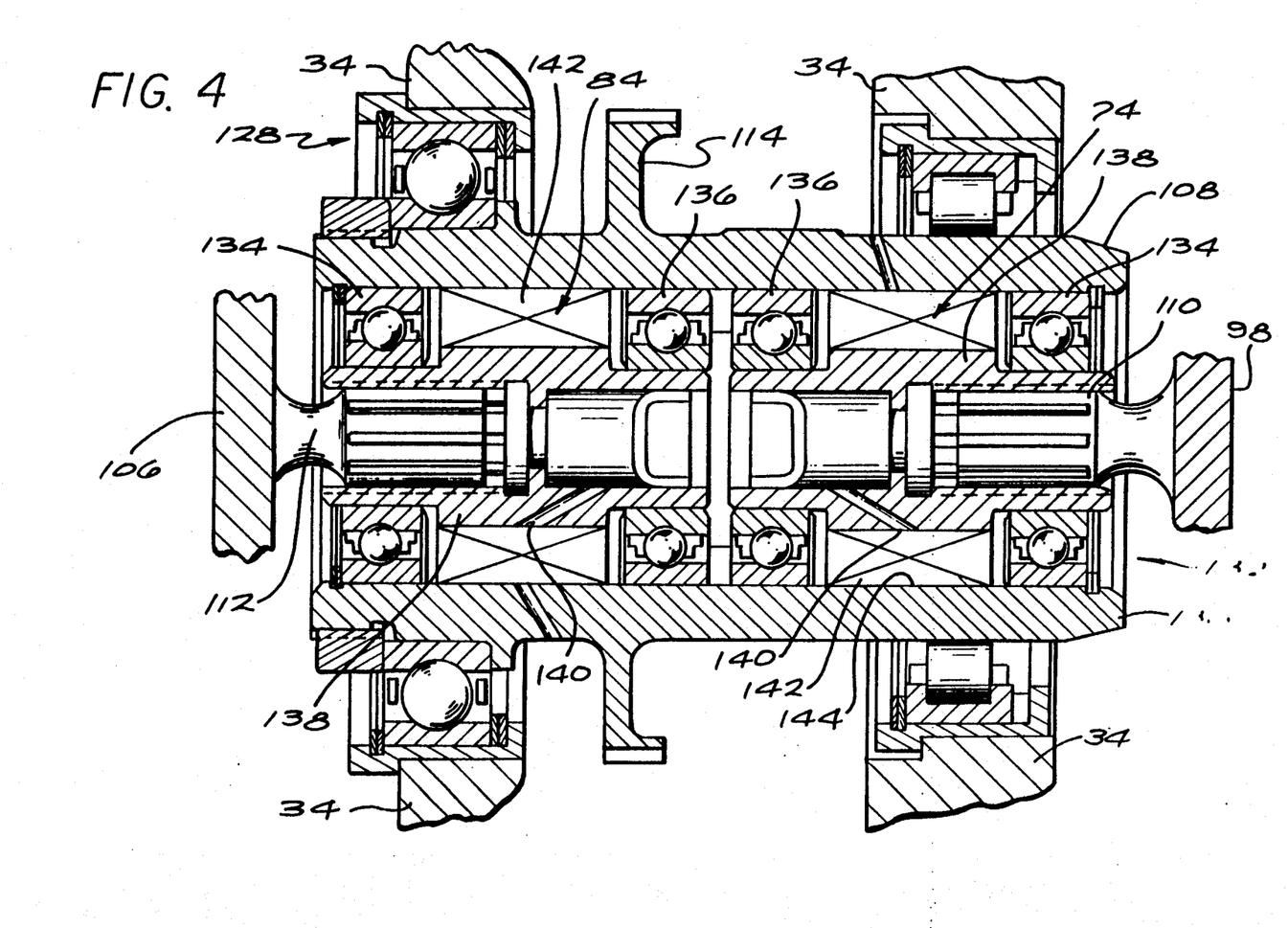
FIG. 4 provides an enlarged fragmentary view of encircled portions of FIGS. 3A and 3B.

Turning now to FIG. 4, the power transfer apparatus 108 is shown enlarged to better illustrate its salient features. Power transfer apparatus 108 at one end includes a bearing 128 which is captively carried upon an elongate tubular body 130 of the PTU 108 and journals upon the gear box 34. A second bearing 132 is removably received in the gear box 34 and journals the tubular body 130 of the PTU 108 at the opposite end thereof. Thus, the PTU 108 is journaled in gear box 34 in coaxial alignment with the carrier members 98, 106, and the stub shafts thereof 110, 112, are received into the PTU 108.

Within the PTU 108, the sprag clutches 74 and 84 are arranged in mirror image fashion. That is, each of the sprag clutch units includes a pair of bearings 134, 136, which cooperatively journal one of a pair of power input sleeves 138. The power input sleeves 138 are internally splined to respectively couple with one of the stub shafts 110, 112. An outer surface 140 of each of the sleeves 138 cooperates with the sprags 142 of the respective clutch 74, 84. These sprags similarly cooperate with an internal surface 144 of the body 130 to complete the one-way clutches. While still viewing FIG. 4, it should be noted that the outer diameter of gear portion 114 of the body 130 of PTU 108 is slightly less than the outer diameter of a bearing carrier portion 146 of the bearing 128. The bearing carrier portion 146 is slidably received in the gear box 34.

Returning now to FIGS. 3, and keeping in mind the structure of the PTU just described, it can be appreciated that if the engine 22 is removed from the gear box 34, the portion of the gear train from pinion 100 to and including carrier 106 and stub shaft 112 removes with the EPU 22. Thus, the PTU 108 is outwardly accessible through the opening in the gear box 34 which is created by removal of engine 22. The PTU 108 itself is removable from the gear box 34 as a complete unit including the bearing 128 and both sprag clutches 74 and 84. The stub shaft 110 remains in the gear box 34 as does normally the bearing 132, after removal of the PTU 108. Of course, the bearing 132 is itself easily removed for service or replacement once the PTU 108 is removed from the gear box 34.

In view of the above, it is easily appreciated that the PTU 108 is easily removed from the gear box 34 for service or replacement without extensive disassembly of the gear box itself. Further, because the turbine engine 22 is a relatively simple apparatus involving far fewer plumbing and electrical connections than does then engine 12, its removal from the MIPU is not excessively burdensome. The result is that the clutches 74, 84 of the PTU 108 can be serviced or replaced while the MIPU 10 is in place aboard an aircraft where access space is available and clean conditions are employed. This service facility of the MIPU 10 considerably increases its availability for use aboard the aircraft, reduce aircraft down time, and decreases the cost of ownership for users of aircraft with the MIPU 10.

While the present invention has been depicted and described by reference to one particularly preferred embodiment of the invention, no limitation upon the invention is implied by such reference, and none is to be inferred. The invention is intended to be limited only by the spirit and scope of the appended claims, which provide additional definition of the invention.

What is claimed is:

1. A power transfer unit comprising an elongate tubular member, said tubular member externally defining first cooperating means for journaling said tubular member upon a housing, said tubular member further externally defining second cooperating means for rotatable shaft power distribution delivering torque from said tubular member to a shaft power consuming device, and a pair of oppositely disposed one-way overrunning clutches carried within said tubular member, each of said pair of clutches being disposed to transmit torque to said tubular member in one rotational direction and to allow said tubular member to overrun relative thereto in said one direction, when said tubular member is rotationally driven at a higher speed by the other of said pair of clutches, each one of said pair of clutches including means for receiving shaft power transmitted thereto.

2. The invention of claim 1 wherein said pair of clutches are coaxially aligned and axially adjacent.

3. The invention of claim 1 wherein said first cooperating means includes a bearing member captively retained upon said tubular member.

4. The invention of claim 3 wherein said bearing member is disposed proximate to one end of said elongate tubular member.

5. The invention of claim 4 wherein said elongate tubular member also defines an externally disposed circumferential journaling surface proximate to the opposite end thereof.

6. The invention of claim 1 wherein said second cooperating means includes a gear portion.

7. The invention of claim 6 wherein said gear portion is integral with the remainder of said elongate tubular member.

8. The invention of claim 1 wherein each of said pair of one way overrunning clutches is a sprag-type clutch.

9. The invention of claim 8 wherein each of said sprag-type clutches includes a plurality of sprags circumferentially arrayed within said tubular member and drivingly cooperable therewith.

10. The invention of claim 9 wherein said means for receiving shaft power includes a respective sleeve member received centrally within the respective circumferential array of sprags and drivingly cooperable therewith, each of said respective sleeve members including central means for receiving torque transmission thereto.

11. A combined auxiliary and emergency power unit comprising:
a gear box;
energy producing equipment mechanically coupled to said gear box to be driven when said gear box is provided with a rotary power input;
first and second turbine wheels for producing said rotary power input;

first and second clutches respectively coupled to said first and second turbine wheels;

a rotary compressor connected to said first turbine wheel to be driven thereby and for providing a compressed air source;

a first combustor for receiving fuel and compressed air from said compressor and combusting the same;

a first nozzle connected to said first combustor and for directing products of combustion therefrom at said first turbine wheel to drive the same and thus cause auxiliary power unit operation when said first clutch is engaged;

a high pressure storage container for storing a compressed air-based oxidant;

a second combustor for receiving fuel and compressed oxidant from said storage container and combusting the same;

a second nozzle connected to said second combustor for receiving combustion gas therefrom and directing the same at said second turbine wheel to drive the same and thus cause emergency power unit operation when said second clutch is engaged; and a power transfer unit mounted in said gear box and including a tubular member, in which said first and second clutches are mounted for delivering said rotary power input thereto, and said tubular member externally defining a gear portion for delivering said rotary power input to said gear box.

12. The combined auxiliary and emergency power unit of claim 11 wherein said energy producing equipment includes an electrical generator.

13. The combined auxiliary and emergency power unit of claim 11 wherein said energy producing equipment includes a hydraulic pump.

14. The combined auxiliary and emergency power unit of claim 11 wherein said energy producing equipment includes an electrical generator and a hydraulic pump.

15. The invention of claim 11 wherein said first and second clutches are oppositely disposed within said power transfer unit, said first and second clutches being arranged to respectively receive shaft power from first and second opposed power input shafts axially aligned with said power transfer unit.

16. The invention of claim 11 wherein said first and second clutches are of one-way overrunning type.

17. The invention of claim 16 wherein said one-way overrunning clutches are of sprag-type.

* * * * *